United States Patent
Kim

(10) Patent No.: US 11,284,309 B2
(45) Date of Patent: Mar. 22, 2022

(54) METHOD AND APPARATUS FOR PERFORMING HANDOVER IN MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/664,753

(22) Filed: Oct. 25, 2019

(65) Prior Publication Data

US 2020/0137638 A1    Apr. 30, 2020

(30) Foreign Application Priority Data

Oct. 26, 2018   (KR) .................. 10-2018-0129342

(51) Int. Cl.
   *H04W 36/00*    (2009.01)
   *H04W 36/06*    (2009.01)

(52) U.S. Cl.
   CPC ........ *H04W 36/0011* (2013.01); *H04W 36/06* (2013.01)

(58) Field of Classification Search
   CPC ............. H04W 36/0011; H04W 36/06; H04W 36/0055; H04W 36/0038
   See application file for complete search history.

(56) References Cited

U.S. PATENT DOCUMENTS

| | | | |
|---|---|---|---|
| 2015/0181470 A1* | 6/2015 | Chai | H04W 36/08 455/438 |
| 2016/0007193 A1* | 1/2016 | Zhang | H04W 4/70 380/270 |
| 2016/0337848 A1 | 11/2016 | Chang et al. | |
| 2017/0318458 A1* | 11/2017 | Laselva | H04L 9/0891 |
| 2018/0041930 A1* | 2/2018 | Hampel | H04W 84/12 |
| 2018/0083688 A1 | 3/2018 | Agiwal et al. | |
| 2018/0124865 A1* | 5/2018 | Lee | H04W 80/02 |
| 2018/0227819 A1 | 8/2018 | Lee et al. | |
| 2018/0279182 A1* | 9/2018 | Sang | H04W 36/0055 |
| 2018/0359657 A1 | 12/2018 | Kim | |
| 2019/0199503 A1* | 6/2019 | Son | H04L 5/0053 |
| 2019/0253945 A1* | 8/2019 | Paladugu | H04W 76/27 |
| 2019/0313309 A1* | 10/2019 | Tsuboi | H04W 88/023 |

FOREIGN PATENT DOCUMENTS

WO    WO-2014035619 A1 *    3/2014    ........ H04W 28/0289

OTHER PUBLICATIONS

3GPP TS 33.401 v13.2.0 Security Architecture (Dated Mar. 2016) (Year: 2016).*

(Continued)

*Primary Examiner* — Nizar N Sivji

(57) ABSTRACT

A method of performing communication, by a user equipment (UE), in a wireless communication system, the method including receiving a radio resource control (RRC) message including a handover command, identifying whether a security key is updated based on the RRC message, and performing a packet data convergence protocol (PDCP) process based on a bearer type and a result of the identification.

9 Claims, 13 Drawing Sheets

(56) References Cited

OTHER PUBLICATIONS

3GPP TSG RAN WG2 Meeting #93bis Dubrovnik, Croatia, Title Discussion on Inter-eNB handover without WT change for LTE-WLAN aggregation (R2-162407) Dated Apr. 11-15, 2016 (Year: 2016).*

ZTE et al., "Consideration on context maintenance", 3GPP TSG-RAN WG2 #97, Feb. 13-17, 2017, R2-1701928, 6 pages.

Samsung, "Impact on control and User Plane procedure due to Intra and Inter CU HO", 3GPP TSG RAN WG2#NR-AdHoc#2 Meeting, Jun. 27-29, 2017, R2-1707105, 4 pages.

LG Electronics Inc., "PDCP re-establishment at RRC Resume", 3GPP TSG-RAN WG2 #103, Aug. 20-24, 2018, R2-1811868, 6 pages.

Notification of Transmittal of the International Search Report and the Written Opinion of the International Searching Authority, or the Declaration dated Feb. 5, 2020 in connection with International Patent Application No. PCT/KR2019/014116, 10 pages.

Ericsson (Rapporteur), "Introduction of SA", 3GPP TSG-WG2 Meeting #103, Aug. 20-24, 2018, R2-1813492, 465 pages.

"3rd Generation Partnership Project; Technical Specification Group Radio Access Network; NR; Packet Data Convergence Protocol (PDCP) specification) (Release 15)", 3GPP TS 38.323 V15.2.0 (Jun. 2018), 27 pages.

Huawei et al., "Discussion on the handling 2 for UM DRD and SRB", 3GPP TSG-RAN WG2 #100, Nov. 27-Dec. 1, 2017, R2-1712325, 2 pages.

Ericsson, "PDCP handling in case of PSCell change", 3GPP TSG-RAN WG2 #100, Nov. 27-Dec. 1, 2017, Tdoc R2-1713435, 4 pages.

Supplementary European Search Report dated Nov. 9, 2021 in connection with European Patent Application No. 19 87 5173, 11 pages.

* cited by examiner

METHOD AND APPARATUS FOR PERFORMING HANDOVER IN MOBILE COMMUNICATION SYSTEM

CROSS-REFERENCE TO RELATED APPLICATION

This application is based on and claims priority under 35 U.S.C. § 119 to Korean Patent Application No. 10-2018-0129342 filed on Oct. 26, 2018 in the Korean Intellectual Property Office, the disclosure of which is incorporated by reference herein in its entirety.

BACKGROUND

1. Field

The disclosure relates to a mobile communication system, and more particularly, to a method and apparatus for performing handover to reduce data processing complexity of a user equipment (UE) in a mobile communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As one of various technologies capable of meeting increasing demand with respect to large-capacity data communication, a method of providing multiple connections has been disclosed. For example, multiple connections may be provided using multiple carriers according to a carrier aggregation (CA) technique for LTE systems. As such, users may use more resources to receive services. In addition, various services including broadcast services such as a multimedia broadcast multicast service (MBMS) may be provided using the LTE systems.

SUMMARY

Provided is a handover procedure considering a case when a security key needs to be updated and a case when a security key does not need to be updated in a mobile communication system.

Additional aspects will be set forth in part in the description which follows and, in part, will be apparent from the description, or may be learned by practice of the presented embodiments of the disclosure.

According to an embodiment of the disclosure, a method of performing communication, by a user equipment (UE), in a wireless communication system includes receiving a radio resource control (RRC) message including a handover command, identifying whether a security key is updated based on the RRC message, and performing a packet data convergence protocol (PDCP) process based on a bearer type and a result of the identification.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
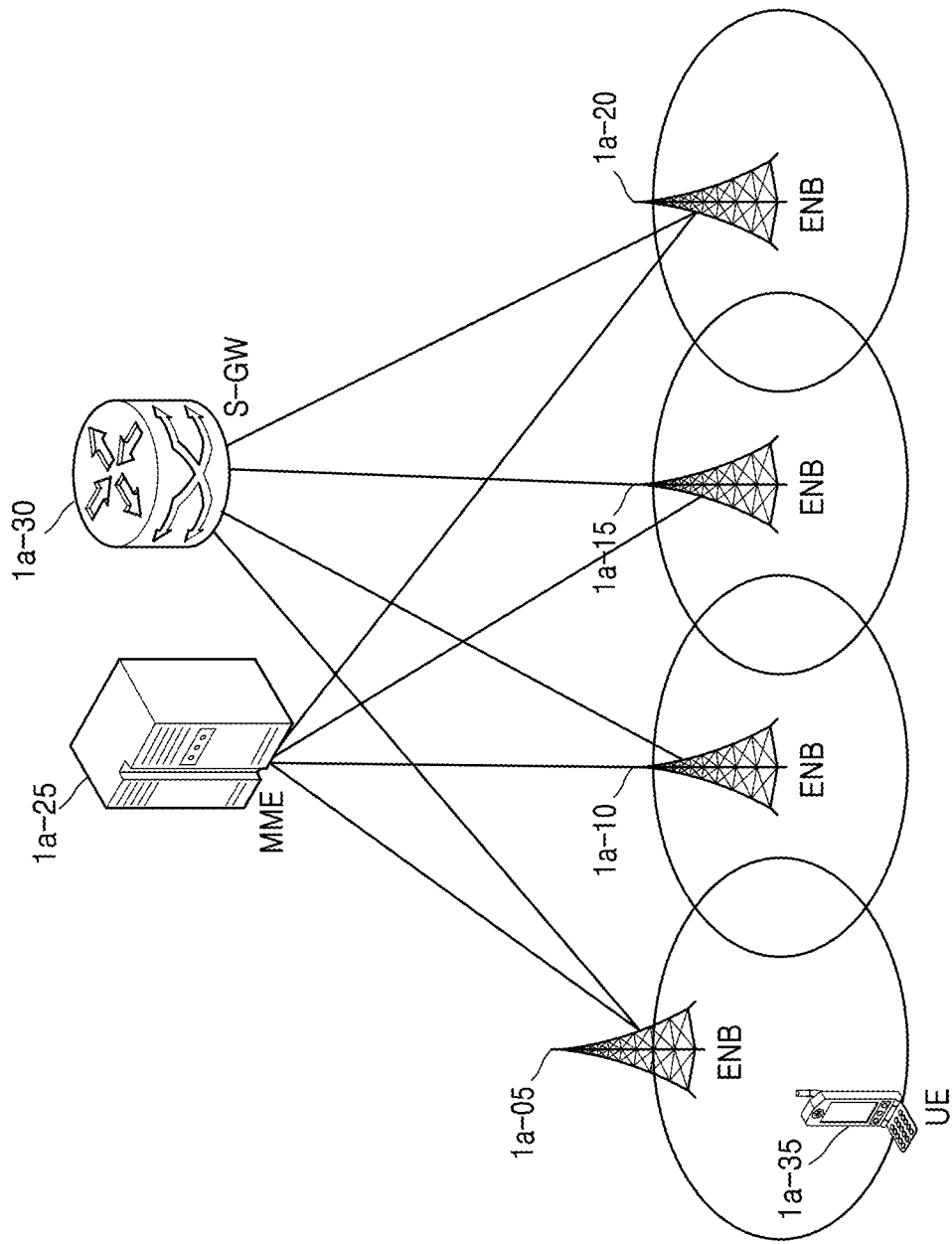
FIG. 1A illustrates a diagram of the architecture of a long term evolution (LTE) system to which an embodiment of the disclosure is applicable.

FIGS. 1A through 1M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, the disclosure will be described in detail by explaining embodiments of the disclosure with reference to the attached drawings. In the following description, a detailed description of known functions and configurations incorporated herein will be omitted when it may make the subject matter of the disclosure unclear. The terms used herein are defined considering functions in the disclosure, and can be changed according to the customs or intents of users or operators. Accordingly, definitions of the terms should be understood on the basis of the entire description of the disclosure.

In the following description, a detailed description of known functions and configurations incorporated herein will be omitted when it may make the subject matter of the disclosure unclear. Hereinafter, the disclosure will be described in detail by explaining embodiments of the disclosure with reference to the attached drawings.

In the following description, terms for identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

To facilitate explanation, the disclosure uses terms and names defined in the 3$^{rd}$ Generation Partnership Project (3GPP) long term evolution (LTE) standards. However, the disclosure is not limited to these terms and names and may be equally applied to systems conforming to other standards. In the following description, the term "evolved node B (eNB)" may be used interchangeably with the term "next-generation node B (gNB)" for convenience of explanation. That is, a base station explained as an eNB may also indicate a gNB. The term "UE" may also indicate a mobile phone, NB-IoT devices, sensors, and other wireless communication devices.

When a security key between a base station and a UE needs to be updated to support handover of the UE in a next-generation mobile communication system, the UE needs to discard all data units created for each bearer, and to create new data units to be processed and transmitted. However, when a security key between a base station and a UE is not updated for handover, the UE does not need to discard all data units created for each bearer, and to newly perform data processing. That is, the UE may transmit or retransmit previously created data units. Therefore, the disclosure proposes, based on implementation of a base station, a case when a security key needs to be updated and a case when a security key does not need to be updated, and proposes a base station implementation method and a UE implementation method for triggering a different data processing operation for each bearer to reduce data processing complexity in a case when a security key needs to be updated and a case when a security key does not need to be updated.

FIG. 1A illustrates a diagram of the architecture of a long term evolution (LTE) system to which an embodiment of the disclosure is applicable.

Referring to FIG. 1A, a radio access network of the LTE system may include a plurality of next-generation base stations (e.g., evolved nodes B (ENBs), nodes B, or base stations) $1a$-05, $1a$-10, $1a$-15, and $1a$-20, a mobility management entity (MME) $1a$-25, and a serving-gateway (S-GW) $1a$-30. A user equipment (UE) (or a mobile station) $1a$-35 may access an external network via the ENB $1a$-05, $1a$-10, $1a$-15, or $1a$-20 and the S-GW $1a$-30.

In FIG. 1A, the ENB $1a$-05, $1a$-10, $1a$-15, or $1a$-20 corresponds to an existing node B of a universal mobile telecommunications system (UMTS). The ENB $1a$-05, $1a$-10, $1a$-15, or $1a$-20 may be connected to the UE $1a$-35 through wireless channels and perform complex functions compared to the existing node B. Because all user traffic data including real-time services such as voice over Internet protocol (VoIP) are serviced through shared channels in the LTE system, an entity for performing scheduling by collating, for example, buffer status information of UEs, available transmit power status information, and channel status information may be required and the ENB $1a$-05, $1a$-10, $1a$-15, or $1a$-20 may operate as such an entity. One ENB generally controls a plurality of cells. For example, the LTE system may use radio access technology such as orthogonal frequency division multiplexing (OFDM) at a bandwidth of 20 MHz to achieve a data rate of 100 Mbps. The LTE system may also use adaptive modulation & coding (AMC) to determine a modulation scheme and a channel coding rate in accordance with a channel status of the UE $1a$-35. The S-GW $1a$-30 is an entity for providing data bearers and may establish or release the data bearers under the control of the MME $1a$-25. The MME $1a$-25 is an entity for performing a mobility management function and various control functions on the UE $1a$-35 and may be connected to the plurality of ENBs $1a$-05, $1a$-10, $1a$-15, and $1a$-20.

Figure 1B:
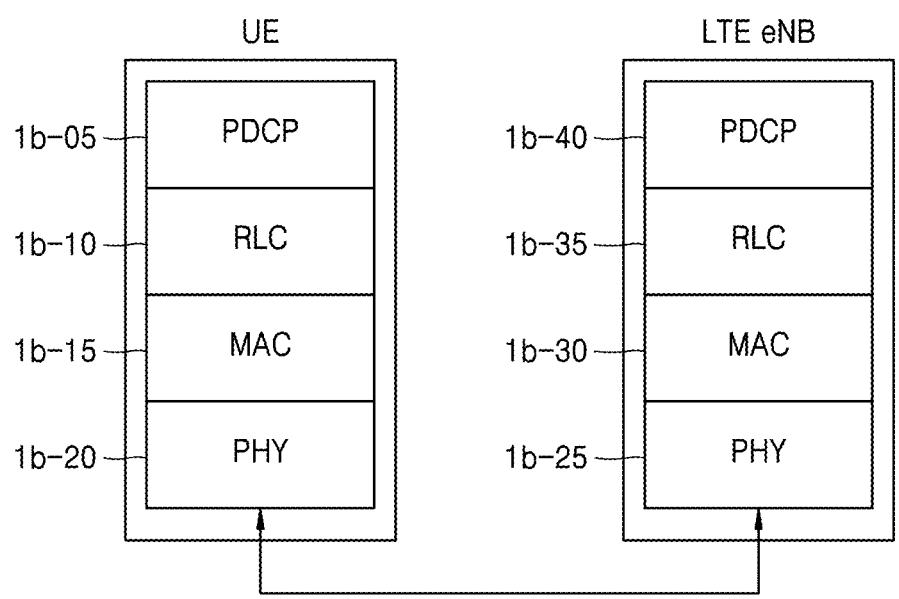
FIG. 1B illustrates a diagram of a radio protocol architecture of an LTE system to which an embodiment of the disclosure is applicable.

FIG. 1B illustrates a diagram of a radio protocol architecture of an LTE system to which an embodiment of the disclosure is applicable.

Referring to FIG. 1B, the radio protocol architecture of the LTE system may include packet data convergence protocol (PDCP) layers $1b$-05 and $1b$-40, radio link control (RLC) layers $1b$-10 and $1b$-35, media access control (MAC) layers $1b$-15 and $1b$-30, and physical (PHY) layers $1b$-20 and $1b$-25 respectively for a UE and an eNB. The PDCP layer $1b$-05 or $1b$-40 is in charge of, for example, Internet protocol (IP) header compression/decompression. Main functions of the PDCP layer $1b$-05 or $1b$-40 are summarized as shown below.

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer $1b$-10 or $1b$-35 may perform, for example, an automatic repeat request (ARQ) operation by reconfiguring PDCP PDUs to appropriate sizes. Main functions of the RLC layer $1b$-10 or $1b$-35 are summarized as shown below.

Transfer of upper layer PDUs
Error correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer $1b$-15 or $1b$-30 may be connected to a plurality of RLC layers configured for one UE, and multiplex RLC PDUs into a MAC PDU and demultiplex the RLC PDUs from the MAC PDU. Main functions of the MAC layer $1b$-15 or $1b$-30 are summarized as shown below.

Mapping between logical channels and transport channels
Multiplexing/demultiplexing of MAC SDUs belonging to one or different logical channels into/from transport blocks (TBs) delivered to/from the physical layer on transport channel s
Scheduling information reporting
Error correction through hybrid ARQ (HARM)
Priority handling between logical channels of one UE
Priority handling between UEs by means of dynamic scheduling
Multimedia broadcast/multicast service (MBMS) service identification
Transport format selection
Padding The PHY layer $1b$-20 or $1b$-25 may channel-code and modulate upper layer data into OFDM symbols and transmit the OFDM symbols through a wireless channel, or demodulate OFDM symbols received through a wireless channel and channel-decode and deliver the OFDM symbols to an upper layer.

Figure 1C:
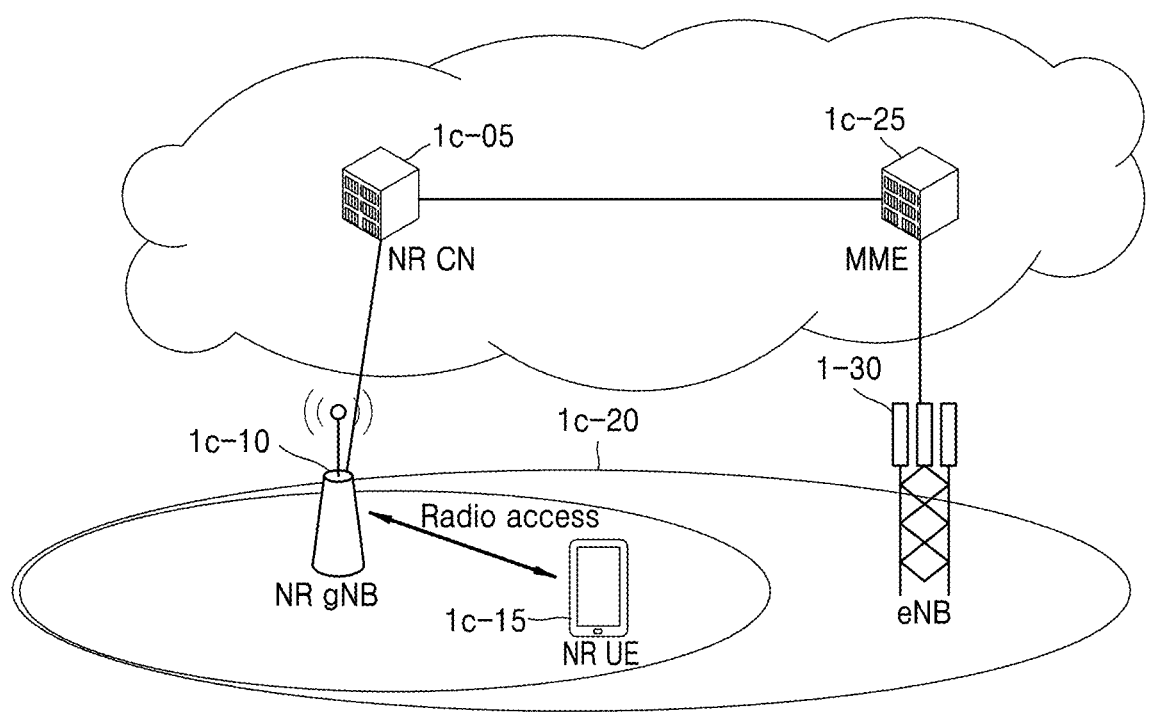
FIG. 1C illustrates a diagram of the architecture of a next-generation mobile communication system to which an embodiment of the disclosure is applicable.

FIG. 1C illustrates a diagram of the architecture of a next-generation mobile communication system to which an embodiment of the disclosure is applicable.

Referring to FIG. 1C, a radio access network of the next-generation mobile communication system (e.g., a new radio (NR) or $5^{th}$ generation (5G) system) includes a next-generation base station (e.g., a new radio node B (NR gNB, NR NB, or gNB) 1c-10 and a new radio core network (NR CN) 1c-05. A new radio user equipment (NR UE) (or UE) 1c-15 may access an external network via the NR gNB 1c-10 and the NR CN 1c-05.

In FIG. 1C, the NR gNB 1c-10 may correspond to an existing evolved node B (eNB) of an LTE system. The NR gNB 1c-10 may be connected to the NR UE 1c-15 through wireless channels and provide superior services compared to an existing node B. Because all user traffic data are serviced through shared channels in the next-generation mobile communication system, an entity for performing scheduling by collating, for example, buffer status information of UEs, available transmit power status information, and channel status information may be required and the NR gNB 1c-10 may operate as such an entity. One NR gNB may control a plurality of cells.

A bandwidth greater than the maximum bandwidth of the existing LTE system may be used to achieve an ultrahigh data rate, and beamforming technology may be additionally used by using radio access technology such as OFDM. AMC may also be used to determine a modulation scheme and a channel coding rate in accordance with a channel status of the NR UE 1c-15. The NR CN 1c-05 may perform functions such as mobility support, bearer establishment, and quality of service (QoS) configuration. The NR CN 1c-05 is an entity for performing a mobility management function and various control functions on the NR UE 1c-15 and may be connected to a plurality of base stations. The next-generation mobile communication system may cooperate with the existing LTE system, and the NR CN 1c-05 may be connected to an MME 1c-25 through a network interface. The MME 1c-25 may be connected to an existing eNB 1c-30.

Figure 1D:
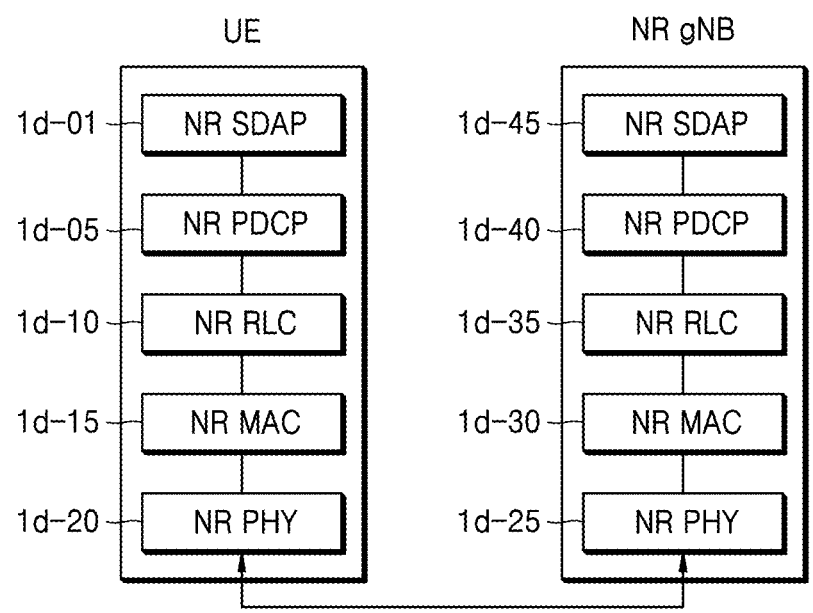
FIG. 1D illustrates a diagram of a radio protocol architecture of a next-generation mobile communication system to which an embodiment of the disclosure is applicable.

FIG. 1D illustrates a diagram of a radio protocol architecture of a next-generation mobile communication system to which an embodiment of the disclosure is applicable.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and an NR gNB.

Main functions of the NR SDAP layer 1d-01 or 1d-45 may include some of the following.
  Transfer of user plane data
  Mapping between a QoS flow and a data radio bearer (DRB) for both DL and UL
  Marking QoS flow identity (ID) in both DL and UL packets
  Reflective QoS flow to DRB mapping for the UL SDAP PDUs With regard to the NR SDAP layer 1d-01 or 1d-45, information about whether to use a header of the NR SDAP layer 1d-01 or to use functions of the NR SDAP layer 1d-01 may be configured for the UE by using a radio resource control (RRC) message per PDCP layer, per bearer, or per logical channel and, when the SDAP header is configured, a 1-bit non access stratum (NAS) reflective QoS indicator and a 1-bit access stratum (AS) reflective QoS indicator of the SDAP header may be used to direct the UE to update or reconfigure UL and DL QoS flow and data bearer mapping information. The SDAP header may include QoS flow ID information indicating QoS. QoS information may be used as data processing priority information or scheduling information for appropriately supporting a service.

Main functions of the NR PDCP layer 1d-05 or 1d-40 may include some of the following.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink In the above-description, the reordering function of the NR PDCP layer 1d-05 or 1d-40 may refer to a function of reordering PDCP PDUs received from a lower layer, on a PDCP sequence number (SN) basis, and include at least one of a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1d-10 or 1d-35 may include at least some of the following.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the above description, the in-sequence delivery function of the NR RLC layer 1d-10 or 1d-35 may refer to a function of delivering RLC SDUs received from a lower layer, to an upper layer in order and, when a plurality of RLC SDUs segmented from one RLC SDU are received, the in-sequence delivery function may include a function of reassembling the RLC SDUs and delivering the reassembled RLC SDU. The in-sequence delivery function may include at least one of a function of reordering received RLC PDUs on a RLC SN or PDCP SN basis, a function of recording missing RLC PDUs by reordering the received RLC PDUs, a function of reporting status information of the missing RLC PDUs to a transmitter, or a function of requesting to retransmit the missing RLC PDUs. The in-sequence delivery function may include a function of delivering only RLC SDUs prior to a missing RLC SDU, to an upper layer in order when the missing RLC SDU exists. According to another example, the in-sequence delivery function may include a function of delivering all RLC SDUs received before a timer starts, to an upper layer in order although a missing RLC SDU exists when a certain timer expires, and include a function of delivering all RLC SDUs received up to a current time, to an upper layer in order although a missing RLC SDU exists when a certain timer expires.

The NR RLC layer 1*d*-10 or 1*d*-35 may process the RLC PDUs in order of reception and deliver the RLC PDUs to the NR PDCP layer 1*d*-05 or 1*d*-40 regardless of SNs (out-of-sequence delivery) and, when a segment is received, the NR RLC layer 1*d*-10 or 1*d*-35 may reassemble and process the segment with other segments stored in a buffer or subsequently received, into a whole RLC PDU and deliver the RLC PDU to the NR PDCP layer 1*d*-05 or 1*d*-40. The NR RLC layer 1*d*-10 or 1*d*-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

The out-of-sequence delivery function of the NR RLC layer 1*d*-10 or 1*d*-35 may refer to a function of directly delivering RLC SDUs received from a lower layer, to an upper layer out of order, include a function of reassembling a plurality of RLC SDUs segmented from one RLC SDU and delivering the reassembled RLC SDU when the segmented RLC SDUs are received, and include a function of recording missing RLC PDUs by storing RLC SNs or PDCP SNs of received RLC PDUs and reordering the received RLC PDUs.

According to an embodiment of the disclosure, the NR MAC layer 1*d*-15 or 1*d*-30 may be connected to a plurality of NR RLC layers configured for one UE, and main functions of the NR MAC layer 1*d*-15 or 1*d*-30 may include at least some of the following.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1*d*-20 or 1*d*-25 may channel-code and modulate upper layer data into OFDM symbols and transmit the OFDM symbols through a wireless channel. The NR PHY layer 1*d*-20 or 1*d*-25 may demodulate OFDM symbols received through a wireless channel and channel-decode and deliver the OFDM symbols to an upper layer.

Figure 1E:
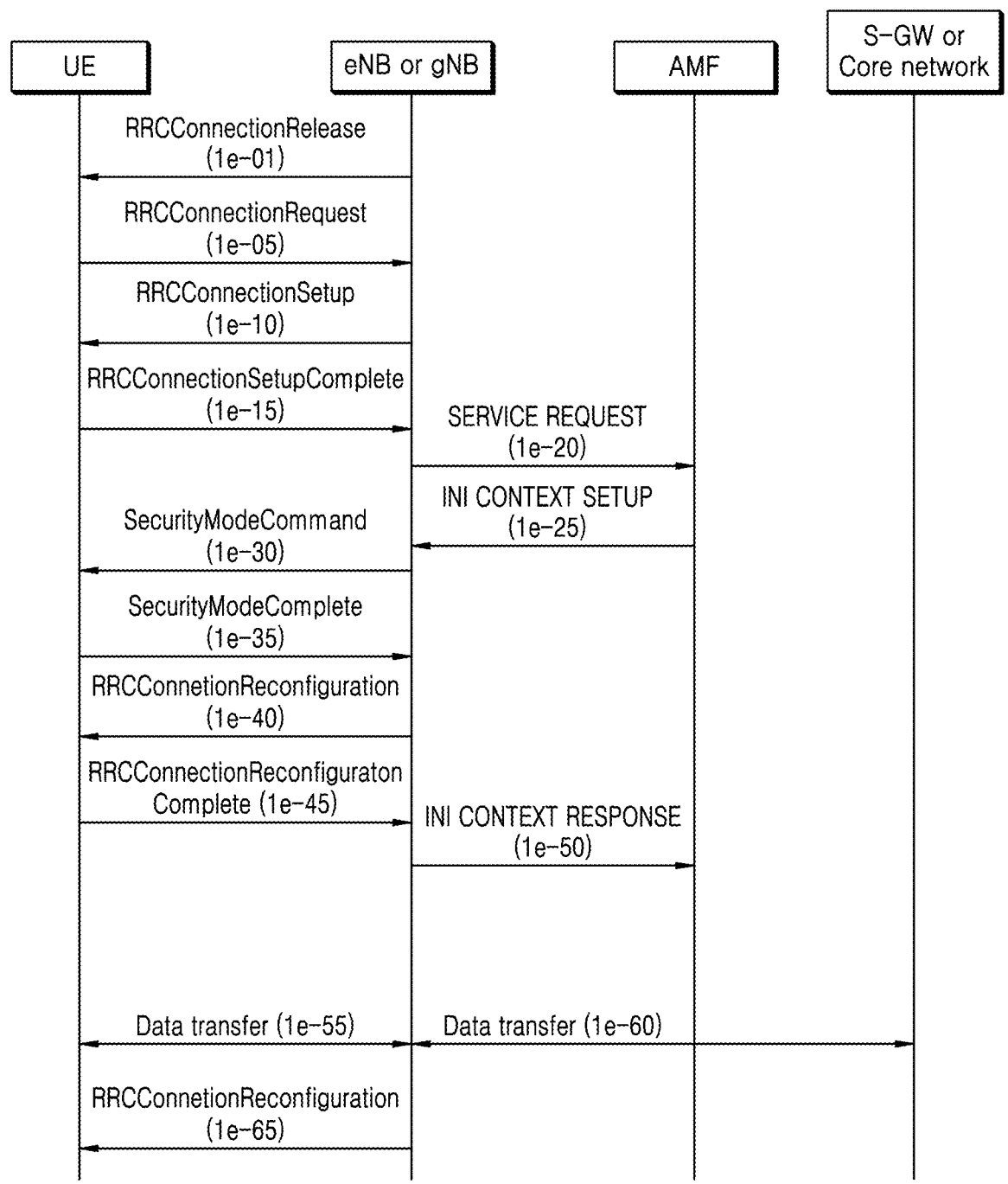
FIG. 1E illustrates a flowchart of a method, performed by a user equipment (UE), of establishing a radio resource control (RRC) connection with a base station to establish a connection with a network in a next-generation mobile communication system, according to an embodiment of the disclosure.

FIG. 1E illustrates a flowchart of a method, performed by a UE, of establishing an RRC connection with a base station to establish a connection with a network in a next-generation mobile communication system, according to an embodiment of the disclosure.

Referring to FIG. 1E, when no data is transmitted to or received from the UE in an RRC connected mode for a certain reason or during a certain time, the base station may transmit an RRCConnectionRelease message to the UE to switch the UE to an RRC idle mode (1*e*-01). Thereafter, when the currently not-connected UE (also referred to as an idle mode UE) has data to be transmitted, the UE may perform an RRC connection establishment procedure with the base station.

The UE may achieve reverse transmission synchronization with the base station through a random access procedure and transmit an RRCConnectionRequest message to the base station (1*e*-05). The RRCConnectionRequest message may include, for example, an identity of the UE and an establishmentCause.

The base station may transmit an RRCConnectionSetup message to allow the UE to establish an RRC connection (1*e*-10). The RRCConnectionSetup message may include at least one of configuration information per logical channel, configuration information per bearer, configuration information of a PDCP layer, configuration information of an RLC layer, or configuration information of a MAC layer.

The RRCConnectionSetup message may indicate PDCP, RLC, MAC, and PHY layer configurations for a bearer corresponding to a certain bearer identity (e.g., a signaling radio bearer (SRB) identity or a data radio bearer (DRB) identity). The RRCConnectionSetup message may include an indicator (e.g., re-establishPDCP) directing whether to perform PDCP re-establishment or an indicator (e.g., recoverPDCP) directing whether to perform PDCP data recovery for the bearer corresponding to the certain bearer identity.

The RRC-connected UE may transmit an RRCConnetionSetupComplete message to the base station (1*e*-15). The RRCConnetionSetupComplete message may include a control message such as a SERVICE REQUEST message of the UE for requesting an AMF or MME to establish a bearer for a certain service. The base station may transmit, to the AMF or MME, the SERVICE REQUEST message contained in the RRCConnetionSetupComplete message (1*e*-20). The AMF or MME may determine whether to provide the service requested by the UE.

Upon determining to provide the service requested by the UE, the AMF or MME may transmit an INITIAL CONTEXT SETUP REQUEST message to the base station (1*e*-25). The INITIAL CONTEXT SETUP REQUEST message may include, for example, QoS information to be used to establish a DRB, and security information (e.g., a security key or a security algorithm) to be applied to the DRB.

The base station may exchange a SecurityModeCommand message (1*e*-30) and a SecurityModeComplete message (1*e*-35) with the UE for security setup. When security setup is completed, the base station may transmit an RRCConnectionReconfiguration message to the UE (1*e*-40).

The RRCConnectionReconfiguration message may indicate PDCP, RLC, MAC, and PHY layer configurations for a bearer corresponding to a specific bearer identity (e.g., an SRB identity or a DRB identity). The RRCConnectionReconfiguration message may include an indicator (e.g., re-establishPDCP) directing whether to perform PDCP re-establishment or an indicator (e.g., recoverPDCP) directing whether to perform PDCP data recovery for the bearer corresponding to the specific bearer identity.

The RRCConnectionReconfiguration message may include configuration information of a DRB through which user data is to be processed, and the UE may establish a DRB by using the configuration information and transmit an RRCConnectionReconfigurationComplete message to the base station (1*e*-45). The base station having completely established the DRB with the UE may transmit an INITIAL CONTEXT SETUP COMPLETE message to the AMF or MME to complete connection establishment (1*e*-50).

When the above-described procedure is completed, the UE may transmit or receive data to or from the base station through a core network (1*e*-55 and 1*e*-60). According to some embodiments of the disclosure, a data transfer procedure may mainly include three steps such as RRC connection establishment, security setup, and DRB establishment. The base station may transmit an RRCConnectionReconfiguration message to the UE to add or change a configuration for a certain reason (1*e*-65).

The RRCConnectionReconfiguration message may indicate PDCP, RLC, MAC, and PHY layer configurations for a bearer corresponding to a specific bearer identity (e.g., an SRB identity or a DRB identity). The RRCConnectionReconfiguration message may include an indicator (e.g., re-establishPDCP) directing whether to perform PDCP reestablishment or an indicator (e.g., recoverPDCP) directing whether to perform PDCP data recovery for the bearer corresponding to the specific bearer identity.

The above-described connection establishment procedure between the UE and the base station, according to the current embodiment of the disclosure, may also be applied to a connection establishment procedure between a UE and an LTE base station and to a connection establishment procedure between a UE and an NR base station.

As used herein, a bearer may include an SRB and a DRB. Herein, the SRB may refer to a signaling radio bearer, and the DRB may refer to a data radio bearer. A UM DRB may refer to a DRB using an RLC layer operating in an unacknowledged mode (UM), and an AM DRB may refer to a DRB using an RLC layer operating in an acknowledged mode (AM).

Figure 1F:
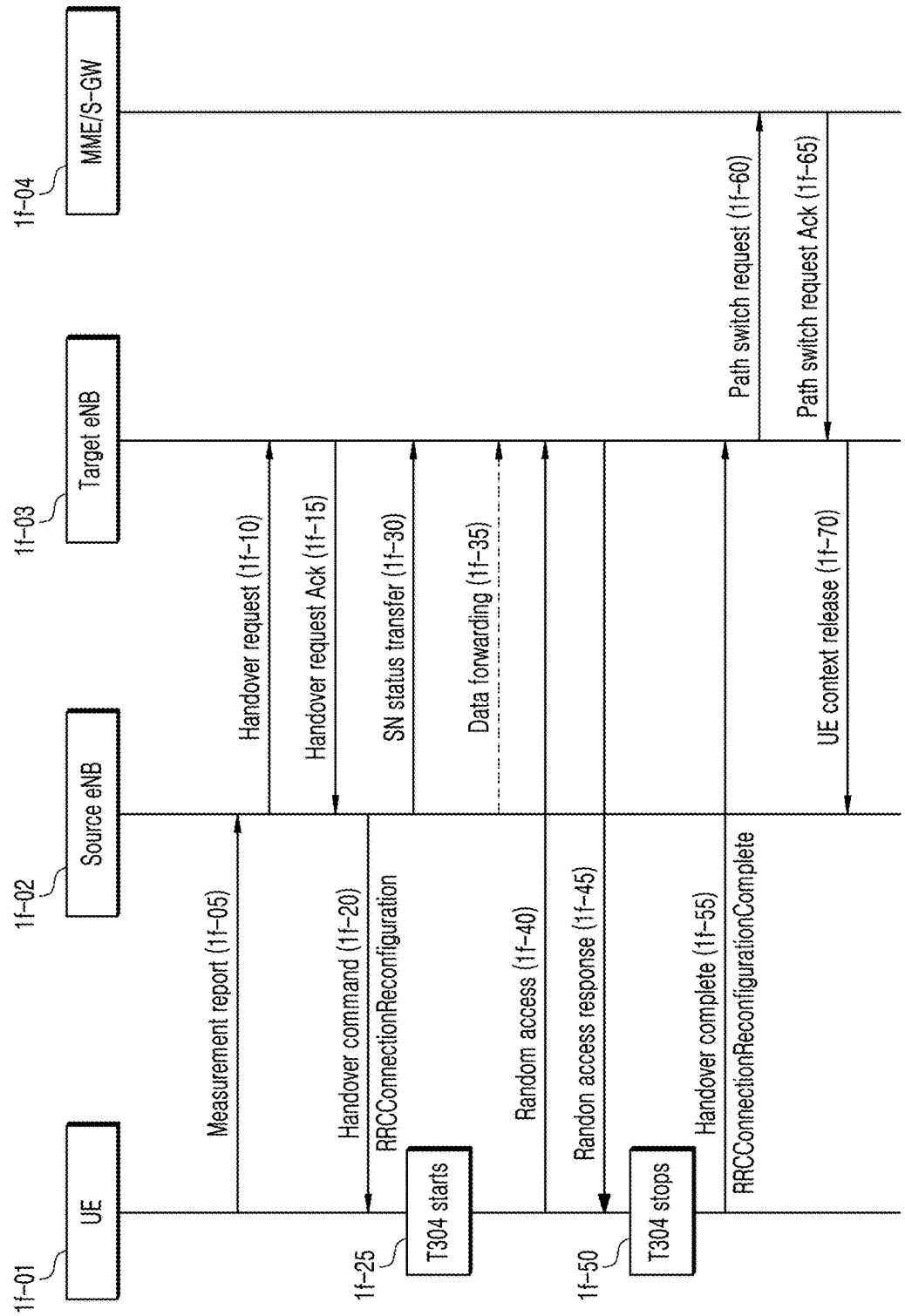
FIG. 1F illustrates a flowchart of a handover procedure in a next-generation mobile communication system, according to an embodiment of the disclosure.

FIG. 1F illustrates a flowchart of a handover procedure in a next-generation mobile communication system, according to an embodiment of the disclosure.

A UE 1f-01 in an RRC connected mode may transmit a measurement report to a current source base station 1f-02 in a periodic manner or when a specific event occurs (1f-05). Based on the above-described measurement report, the source base station 1f-02 may determine whether to hand the UE 1f-01 over to an adjacent cell. The handover refers to a technology for switching a source base station for providing a service to a UE in a connected mode, to another base station. Upon determining handover, the source base station 1f-02 may transmit a handover (HO) request message to a new base station for providing a service to the UE 1f-01, i.e., a target base station 1f-03, to request handover (1f-10). When the target base station 1f-03 accepts the handover request, the target base station 1f-03 may transmit a HO request acknowledgement (Ack) message to the source base station 1f-02 (1f-15). The source base station 1f-02 having received the HO request Ack message may transmit a HO command message to the UE 1f-01 (1f-20). The HO command message may be transmitted from the source base station 1f-02 to the UE 1f-01 by using an RRCConnection-Reconfiguration message (1f-20).

When the HO command message is received, the UE 1f-01 may terminate data transmission and reception to and from the source base station 1f-02 and start a timer T304. The timer T304 returns the UE 1f-01 to a previous configuration and switches the UE 1f-01 to an RRC idle mode when the UE 1f-01 does not succeed in handover to the target base station 1f-03 during a certain time. The source base station 1f-02 may transmit, to the target base station 1f-03, a sequence number (SN) status transfer message for uplink/downlink data (1f-30), and forward downlink data to the target base station 1f-03 when the source base station 1f-02 has the downlink data (1f-35).

The UE 1f-01 may attempt random access to a target cell indicated by the source base station 1f-02 (1f-40). The random access may be performed to notify that the UE 1f-01 performs handover to the target cell, and to achieve uplink synchronization. For the random access, the UE 1f-01 may transmit, to the target cell, a preamble corresponding to a preamble ID received from the source base station 1f-02, or a randomly selected preamble ID. After a specific number of subframes from the preamble transmission, the UE 1f-01 may monitor whether a random access response (RAR) message is transmitted from the target cell. A monitoring time period may be explained using a RAR window. When the RAR message is received during a specific time (1f-45), the UE 1f-01 may transmit a HO complete message to the target base station 1f-03 by using an RRCConnectionReconfigurationComplete message (1f-55).

When the RAR message is successfully received from the target base station 1f-03, the UE 1f-01 may stop the timer T304 (1f-50). The target base station 1f-03 may request an MME 1f-04 to switch paths of bearers established to the source base station 1f-02 (1f-60 and 1f-65), and request the source base station 1f-02 to release UE context of the UE 1f-01 (1f-70). Therefore, the UE 1f-01 may attempt data reception from the target base station 1f-03 after a timing when the RAR window starts, and start data transmission to the target base station 1f-03 by transmitting the RRCConnectionReconfigurationComplete message after the RAR message is received.

Figure 1G:
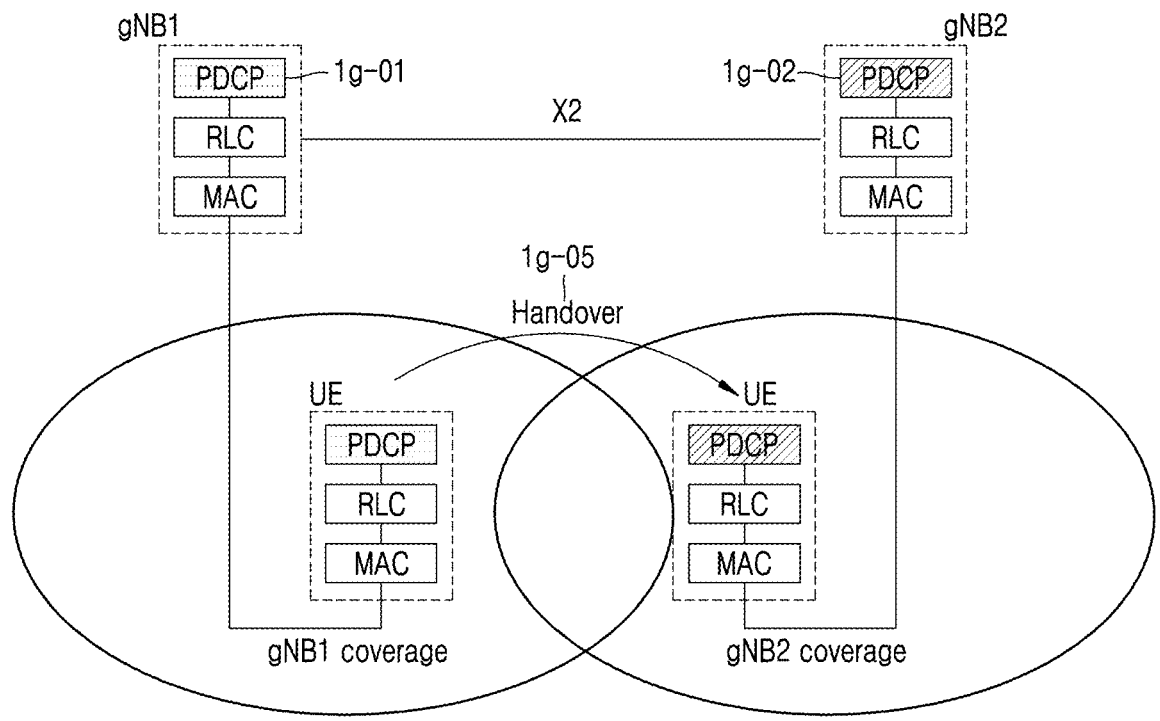
FIG. 1G illustrates a diagram for describing a handover procedure within a base station and a handover procedure between base stations, according to an embodiment of the disclosure.
Figure 1G:
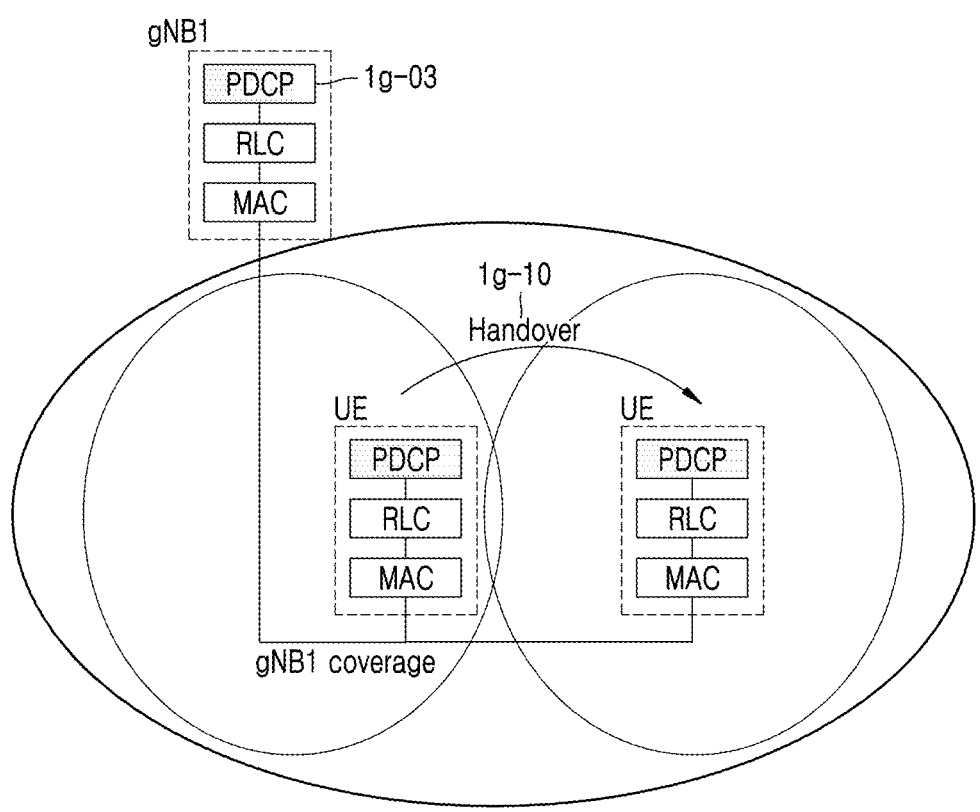

FIG. 1G illustrates a diagram for describing a handover procedure within a base station and a handover procedure between base stations, according to an embodiment of the disclosure.

Referring to FIG. 1G, when handover is performed between base stations (1g-05) or when PDCP layers 1g-01 of a source base station are changed to new PDCP layers 1g-02 of a target base station after handover, PDCP layers for each bearer of a UE, which have exchanged data with the PDCP layers 1g-01 for each bearer of the source base station, need to exchange data with the new PDCP layers 1g-02 for each bearer of the target base station after handover is performed. When a connection is established with a new node or base station in a handover procedure, a security key needs to be updated to enhance security. That is, a different security key needs to be used to establish a data connection with a different node.

The source base station may determine, together with the target base station, to hand over the UE, and then direct the UE to perform transmitting and receiving PDCP re-establishment for each bearer in such a manner that the UE may update the security key and successfully complete the handover.

Embodiments of the disclosure related to a PDCP re-establishment procedure of a transmitting PDCP layer and a receiving PDCP layer are as described below.

When an upper layer (e.g., an RRC layer) requests PDCP re-establishment for a specific bearer, a transmitting PDCP layer may perform the following procedure. As a security key is updated, all of previously created PDCP PDUs are discarded and new data units need to be processed and created using a new security key.

1. When an indicator directing to continuously use a header compression protocol for UM DRBs and AM DRBs is not present, the header compression protocol is reset and a unidirectional (U) mode of an initialization and refresh (IR) state is started.

2. A window state variable (e.g., TX NEXT) is set to an initial value for UM DRBs and SRB s.

3. All stored data units (e.g., PDCP SDUs or PDCP PDUs) for SRBs are discarded. (The data units are RRC messages created to be transmitted to the source base station and thus are discarded not to be transmitted to the target base station.)

4. A new security key and an encryption algorithm received from an upper layer (e.g., an RRC layer) are applied.

5. A new security key and an integrity protection algorithm received from an upper layer (e.g., an RRC layer) are applied.

6. For UM DRBs, (after all of the previously stored PDCP PDUs are discarded) data units (e.g., PDCP SDUs), for which PDCP SNs are already allocated but which are not delivered to a lower layer, are considered like data units received from an upper layer (e.g., an SDAP layer or a transmission control protocol/Internet protocol (TCP/IP) layer), and are transmitted in ascending order of COUNT values (or PDCP SNs) allocated before PDCP re-establishment. A data discard timer is not restarted. Specifically, the data units (e.g., the PDCP SDUs) are newly header-compressed, are integrity-protected or encrypted again, are PDCP-header-configured, and are delivered to the lower layer.

7. For AM DRBs, (after all of the previously stored PDCP PDUs are discarded) data units (e.g., PDCP SDUs) from the first data unit, an acknowledgement of which is not received from lower layers (e.g., RLC layers), are newly header-compressed, are integrity-protected or encrypted again, are PDCP-header-configured, and are delivered to the lower layers for retransmission or transmission in ascending order of COUNT values (or PDCP SNs) allocated before PDCP re-establishment. That is, the data units from the first data unit, an acknowledgement of which is not received, are accumulatively retransmitted.

When an upper layer (e.g., an RRC layer) requests PDCP re-establishment, a receiving PDCP layer performs the following procedure.

1. Data units (e.g., PDCP PDUs) received from lower layers (e.g., RLC layers) due to re-establishment of the lower layers are processed.

2. All stored data units (e.g., PDCP SDUs or PDCP PDUs) for SRBs are discarded. (All the stored data units for SRBs are RRC messages received from the source base station and thus are discarded.)

3. A reordering timer is stopped and reset when the timer is operating for SRBs and UM DRBs, and all of stored data units (e.g., PDCP SDUs) for UM DRBs are header-decompressed and are delivered to an upper layer.

4. When an indicator directing to continuously use a header decompression protocol for AM DRBs is not present, header decompression is performed on stored data units (e.g., PDCP SDUs).

5. When an indicator directing to continuously use a header decompression protocol for UM DRBs and AM DRBs is not present, a downlink header decompression protocol is reset and a unidirectional (U) mode of a no context (NC) state is started.

6. Window variables (e.g., RX NEXT and RX DELIV) are set to initial values for UM DRBs and SRBs.

7. A new security key and an encryption/decryption algorithm received from an upper layer (e.g., an RRC layer) are applied.

8. A new security key and an integrity protection/verification algorithm received from an upper layer (e.g., an RRC layer) are applied.

In the PDCP re-establishment procedure according to the disclosure, the transmitting PDCP layer always performs accumulated retransmission. However, unnecessary transmission may be prevented and waste of transmission resources may also be prevented by allowing the transmitting PDCP layer to perform selective retransmission. The selective retransmission refers to retransmission of only data units, acknowledgements (e.g., RLC ACK) of which are not received from lower layers (e.g., RLC layers), by the transmitting PDCP layer.

However, in the handover procedure of FIG. 1F, PDCP re-establishment triggered by a base station may cause data loss when selective retransmission is used all the time. Because data units successfully received by a PDCP layer of a source base station are not compulsorily forwarded to a PDCP layer of a target base station, although the source base station reports successful reception of a UE, data units, acknowledgements of which are received by the target base station by using RLC ACK, also need to be retransmitted. That is, in the PDCP re-establishment, the UE may need to perform accumulated retransmission to retransmit data units in order from a data unit corresponding to the first PDCP SN, an acknowledgement of which is not received. Therefore, although data units, acknowledgements (e.g., RLC ACK) of which are received from lower layers, are included in data units having SNs greater than the first PDCP SN, an acknowledgement of which is not received, such data units need to be retransmitted.

However, in FIG. 1G, when handover is performed within a base station (1g-10) or when PDCP layers 1g-03 of a source base station are not changed after handover, PDCP layers for each bearer of a UE, which have exchanged data with the PDCP layers 1g-03 for each bearer of the source base station, may continuously exchange data with the PDCP layers 1g-03 for each bearer of the source base station after handover is performed. The above-described handover procedure does not correspond to establishment of a connection with a new node or base station but corresponds to reestablishment of a connection with another cell of a connected node or base station, and thus a security key does not need to be updated. That is, an existing security key may be continuously used after handover.

In the disclosure, when handover is performed within a source base station and thus PDCP layers are not changed, a UE may perform a selective retransmission method according to an embodiment of the disclosure and thus unnecessary retransmission and waste of transmission resources may be prevented. Furthermore, in the disclosure, the UE may not need to unnecessarily discard existing data and re-create new data by performing data processing again as in a PDCP re-establishment procedure, and thus data processing complexity of the UE may be reduced. Therefore, when handover is performed within the source base station and thus the PDCP layers are not changed, the base station may direct to perform PDCP data recovery only for AM DRBs of the UE. For SRBs or UM DRBs, the base station may not direct a PDCP procedure and may direct to continuously use data after handover.

Embodiments of the disclosure related to a PDCP data recovery procedure for bearers of a UE are as described below.

1. When an upper layer (e.g., an RRC layer) requests PDCP data recovery for AM DRBs, a transmitting PDCP layer performs the following procedure.

A. From among data units (e.g., PDCP PDUs) previously transmitted to a re-established AM-mode RLC layer or a connection-released AM-mode RLC layer, only all data units, acknowledgements (e.g., RLC ACK) of which are not received from lower layers (e.g., RLC layers), are selectively retransmitted in ascending order of COUNT values (or PDCP SNs). For data units which are previously stored in a buffer or data units which have not been created yet, data units may be created and be transmitted and retransmitted.

Figure 1H:
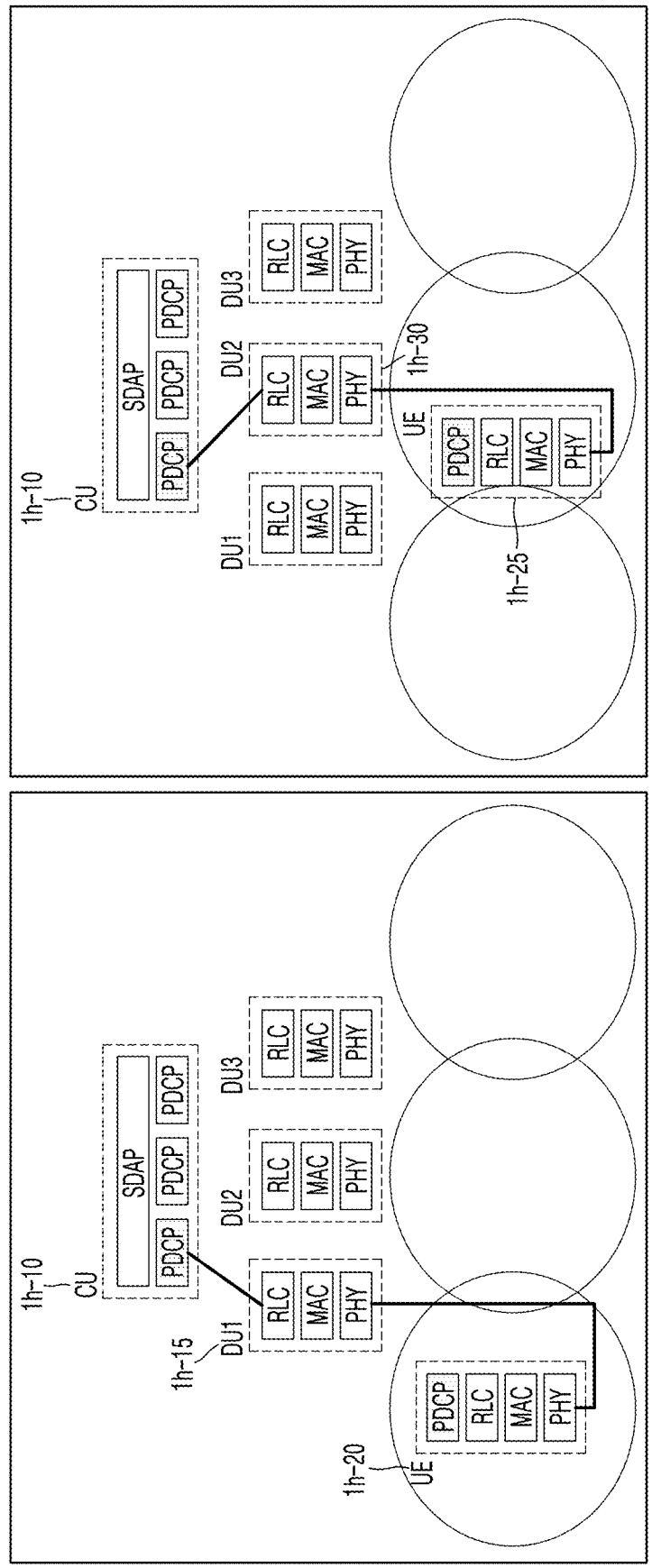
FIG. 1H illustrates a diagram for describing the architecture of a base station implementable in a next-generation mobile communication system, and a handover procedure performed within one central unit (CU), according to an embodiment of the disclosure.

FIG. 1H illustrates a diagram for describing the architecture of a base station implementable in a next-generation mobile communication system, and a handover procedure performed within one central unit (CU), according to an embodiment of the disclosure.

In FIG. 1H, as indicated by reference numeral 1h-05, one base station may serve a very wide area in the next-generation mobile communication system. Specifically, the base station may have a CU-distributed unit (DU) split architecture, and include one CU in which upper layers (e.g., TCP/IP, SDAP, and PDCP layers) operate as indicated by reference numeral 1h-10, and a plurality of DUs in which lower layers (e.g., RLC, MAC, and PHY layers) operate as indicated by reference numerals 1h-15 and 1h-30 in terms of a protocol architecture. The CU may be connected to the plurality of DUs in a wired or wireless manner.

Within a large cell served by the base station having the above-described architecture, a UE 1h-20 may establish a connection to one DU 1h-15 to transmit or receive data. Due to mobility of the UE 1h-20, the UE 1h-20 may perform handover to another DU 1h-30 within the base station. It should be noted that handover within one base station in the above-described CU-DU split architecture is performed within an area served by the CU without changing the CU as indicated by reference numeral 1h-10, and thus PDCP layers of the UE 1h-20 and PDCP layers of the base station for transmitting and receiving data through each bearer are not changed. That is, differently from the handover between base stations (1g-05) and similarly to the handover within a base station (1g-10), which are described above in relation to FIG. 1G, the PDCP layers of the base station are not changed and a security key does not need to be updated because handover is performed within the same node.

Therefore, the base station may direct the UE 1h-20 to perform handover without updating the security key. When the security key is not updated, PDCP layers of each bearer do not need to update an encryption and decryption algorithm and an integrity protection and verification algorithm by using a new security key and do not need to process stored data units again, and thus transmission delay may be reduced.

In the next-generation mobile communication system, the UE 1h-20 may pre-process lots of data units before receiving an uplink grant. Therefore, when all of previously created data units are discarded and new data units are created although the security key is not changed or although the same ROHC context is continuously used, implementation complexity may be increased and unnecessary data processing may also be increased.

Handover from a base station of a next-generation mobile communication system to a base station of an LTE system, or handover from a base station of an LTE system to a base station of a next-generation mobile communication system may be performed in the same manner as handover between base stations.

Figure 1I:
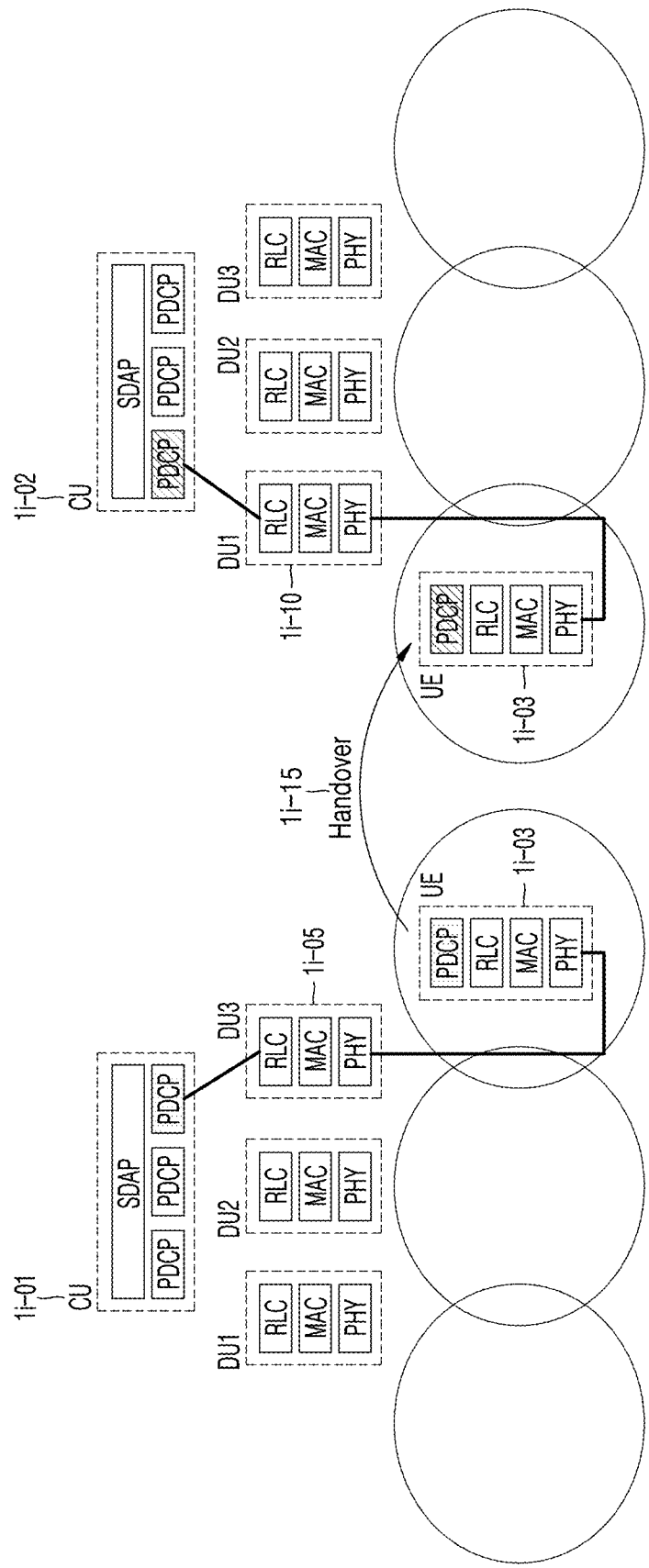
FIG. 1I illustrates a diagram for describing the architecture of a base station implementable in a next-generation mobile communication system, and a handover procedure performed between CU nodes, according to an embodiment of the disclosure.

FIG. 1I illustrates a diagram for describing the architecture of a base station implementable in a next-generation mobile communication system, and a handover procedure performed between CU nodes, according to an embodiment of the disclosure.

In FIG. 1I, when handover is performed between CU nodes (1i-15) or when PDCP layers 1i-01 of a CU node or base station are changed to new PDCP layers 1i-02 of a target CU node or base station after handover, PDCP layers for each bearer of a UE, which have exchanged data with the PDCP layers 1i-01 for each bearer of the source CU node or base station, need to exchange data with the new PDCP layers 1i-02 for each bearer of the target CU node or base station after handover is performed. When a connection is established with a new CU node or base station in a handover procedure, a security key needs to be updated to enhance security. That is, a different security key needs to be used to establish a data connection with a different node.

The source CU node or base station may determine, together with the target CU node or base station, to hand over the UE, and then direct the UE to perform transmitting and receiving PDCP re-establishment for each bearer in such a manner that the UE may update the security key and successfully complete the handover.

Embodiments of the disclosure related to a handover implementation method of a base station are as described below.

1. Embodiment 1-1

When a base station having a CU-DU split architecture (e.g., an architecture having PDCP layers in a CU and having RLC/MAC/PHY layers in DUs, i.e., a base station architecture for physically separating L2 protocols) hands over a UE within one DU or between DUs connected to the same CU, the base station may not allocate a new security key and may direct the same PDCP procedure regardless of bearer types.
 The base station triggers PDCP re-establishment for all of SRBs, UM DRBs, and AM DRB of the UE.
 The base station triggers PDCP re-establishment in units of a UE without considering bearers of the UE to direct handover, and thus network implementation is simplified.

2. Embodiment 1-2

When a base station having a CU-DU split architecture hands over a UE within one DU or between DUs connected to the same CU, the base station may not allocate a new security key and may direct a different PDCP procedure based on a bearer type.
 For SRBs, PDCP re-establishment is triggered.
 For UM DRBs, PDCP re-establishment is triggered.
 For AM DRBs, PDCP data recovery is triggered.
 Because the base station triggers a different PDCP procedure (e.g., PDCP re-establishment or PDCP data recovery) by considering bearers of the UE to direct handover, for AM DRBs, unnecessary data processing may be prevented and unnecessary retransmission may also be prevented. While all of existing data units are discarded and new data units are created and transmitted or accumulatively retransmitted in a PDCP re-establishment procedure, existing data units are transmitted or selectively retransmitted in a PDCP data recovery procedure.

3. Embodiment 1-3

When a base station having a CU-DU split architecture hands over a UE within one DU or between DUs connected to the same CU, the base station may not allocate a new security key and may distinguish security keys based on bearer types and direct PDCP data recovery only for AM DRBs.
 For AM DRBs, PDCP data recovery is triggered.
 For SRBs and UM DRBs, no PDCP procedure may be triggered.
 For SRBs and UM DRBs, unnecessary data processing may be prevented and, for AM DRBs, unnecessary data processing of the UE may be reduced and unnecessary retransmission may be prevented.
 For AM DRBs, when PDCP data recovery is triggered, unnecessary data processing may be prevented and unnecessary retransmission may also be prevented. While all of existing data units are discarded and new data units are created and transmitted or accumulatively retransmitted in a PDCP re-establishment procedure, existing data units are transmitted or selectively retransmitted in a PDCP data recovery procedure.

4. Embodiment 1-4

When a base station having a CU-DU split architecture hands over a UE between different CUs, the base station may allocate a new security key and direct the same PDCP procedure for all DRBs.

For all of SRBs, UM DRBs, and AM DRBs, PDCP re-establishment is triggered.

Embodiments of the disclosure related to a handover implementation method of a UE are as described below.

In the UE according to an embodiment of the disclosure, an RRC layer may determine whether a security key is changed or not, by determining whether an RRC message including a handover command includes new security key configuration information, and transmit or share the security key change information to or with a PDCP layer. As another method, the RRC layer may determine whether the security key is changed or not, by comparing the new security key configuration information included in the RRC message including the handover command, to existing security key configuration information, and transmit or share the security key change information to or with the PDCP layer.

1. Embodiment 2-1

When a UE receives an RRC message and is directed to perform handover, and when an RRC layer determines that a security key is changed, the UE may perform a PDCP procedure as directed by a base station.

For SRBs, UM DRBs, and AM DRBs, a PDCP procedure is performed as directed by the base station (for example, PDCP re-establishment is performed for all bearers).

2. Embodiment 2-2

When a UE receives an RRC message and is directed to perform handover, and when an RRC layer determines that a security key is not changed, the UE may perform a different PDCP procedure based on a bearer type.

For SRBs, a PDCP procedure is performed as directed by a base station (for example, PDCP re-establishment is performed or no procedure is performed).

For UM DRBs, a PDCP procedure is performed as directed by the base station (for example, PDCP re-establishment is performed or no procedure is performed).

For AM DRBs, PDCP data recovery is performed regardless of a direction of the base station to prevent unnecessary data processing and unnecessary retransmission.

For AM DRBs, when PDCP data recovery is triggered, unnecessary data processing may be prevented and unnecessary retransmission may also be prevented. While all of existing data units are discarded and new data units are created and transmitted or accumulatively retransmitted in a PDCP re-establishment procedure, existing data units are transmitted or selectively retransmitted in a PDCP data recovery procedure.

3. Embodiment 2-3

When a UE receives an RRC message and is directed to perform handover, when an RRC layer determines that a security key is not changed, and when an ROHC protocol per bearer is reset (for example, when an indicator (e.g., drbROHCContinue) directing to continuously use a header compression protocol is not present), the UE may perform a PDCP procedure as directed by a base station.

For SRBs, UM DRBs, and AM DRBs, a PDCP procedure is performed as directed by the base station (for example, PDCP re-establishment is performed, no procedure is performed, or PDCP data recovery is performed).

When the ROHC protocol is reset, data units compressed using a previous ROHC protocol need to be compressed again by using the reset ROHC protocol, and thus PDCP re-establishment may be performed for bearers for which ROHC is configured.

4. Embodiment 2-4

When a UE receives an RRC message and is directed to perform handover, when an RRC layer determines that a security key is not changed, and when an ROHC protocol per bearer is not reset (for example, when an indicator (e.g., drbROHCContinue) directing to continuously use a header compression protocol is present), the UE may perform a different PDCP procedure based on a bearer type.

For SRBs, a PDCP procedure is performed as directed by a base station (for example, PDCP re-establishment is performed or no procedure is performed).

For UM DRBs, a PDCP procedure is performed as directed by the base station (for example, PDCP re-establishment is performed or no procedure is performed).

For AM DRBs, PDCP data recovery is performed regardless of a direction of the base station to prevent unnecessary data processing and unnecessary retransmission.

Because the ROHC protocol is not reset, previously compressed data units may be continuously used.

For AM DRBs, when PDCP data recovery is triggered, unnecessary data processing may be prevented and unnecessary retransmission may also be prevented. While all of existing data units are discarded and new data units are created and transmitted or accumulatively retransmitted in a PDCP re-establishment procedure, existing data units are transmitted or selectively retransmitted in a PDCP data recovery procedure.

Figure 1J:
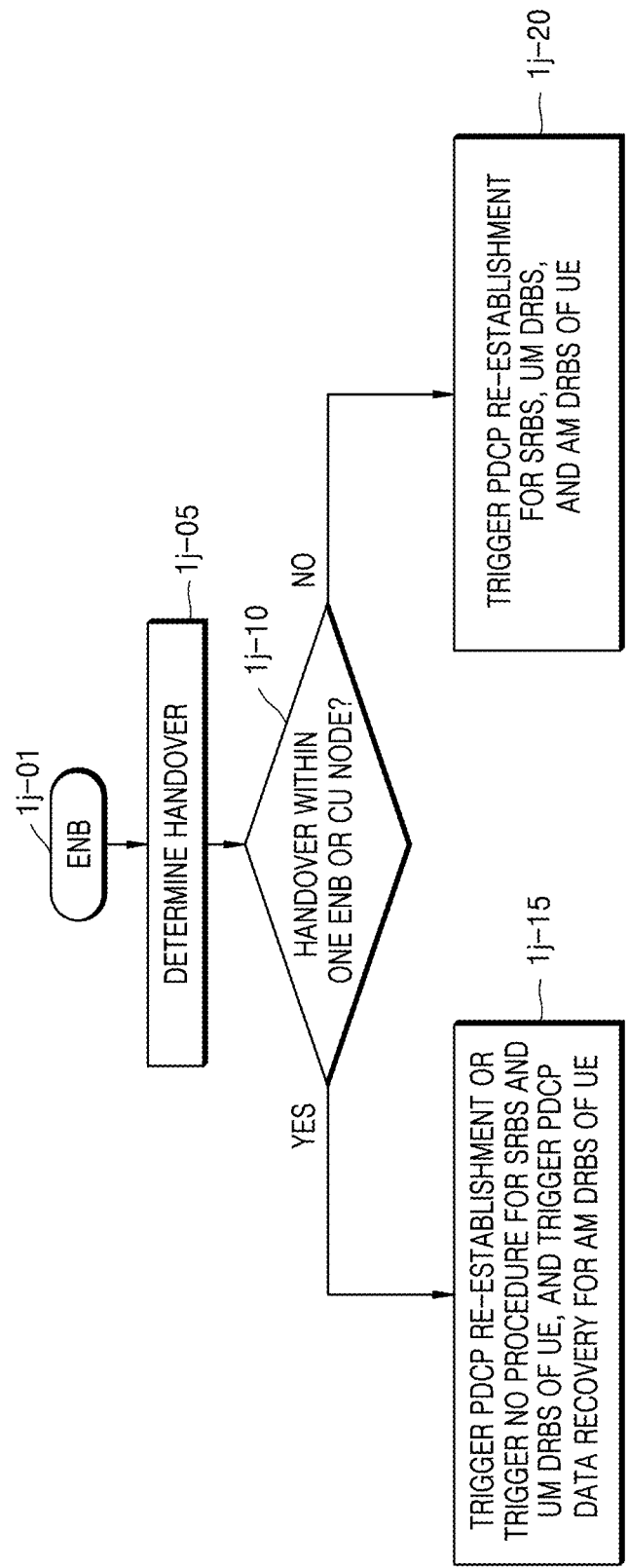
FIG. 1J illustrates a flowchart of a handover directing operation per bearer of a base station, according to an embodiment of the disclosure.

FIG. 1J illustrates a flowchart of a handover directing operation per bearer of a base station 1j-01, according to an embodiment of the disclosure.

In FIG. 1J, when the base station 1j-01 having a CU-DU split architecture determines handover (1j-05), and determines to hand over a UE within one DU or between DUs connected to the same CU (1j-10), the base station 1j-01 may not allocate a new security key and may distinguish security keys based on bearer types and direct PDCP data recovery only for AM DRBs. That is, the base station 1j-01 may trigger PDCP data recovery for AM DRBs, and trigger no PDCP procedure for SRBs and UM DRBs. As another method, the base station 1j-01 may trigger PDCP re-establishment for SRBs and UM DRBs to achieve variable synchronization between the base station 1j-01 and the UE (1j-15).

When the base station 1j-01 determines to hand over the UE between different CUs (1j-10), the base station 1j-01 may allocate a new security key and direct the same PDCP procedure for all DRBs. That is, the base station 1j-01 may trigger PDCP re-establishment for all of SRBs, UM DRBs, and AM DRBs (1j-20).

Figure 1K:
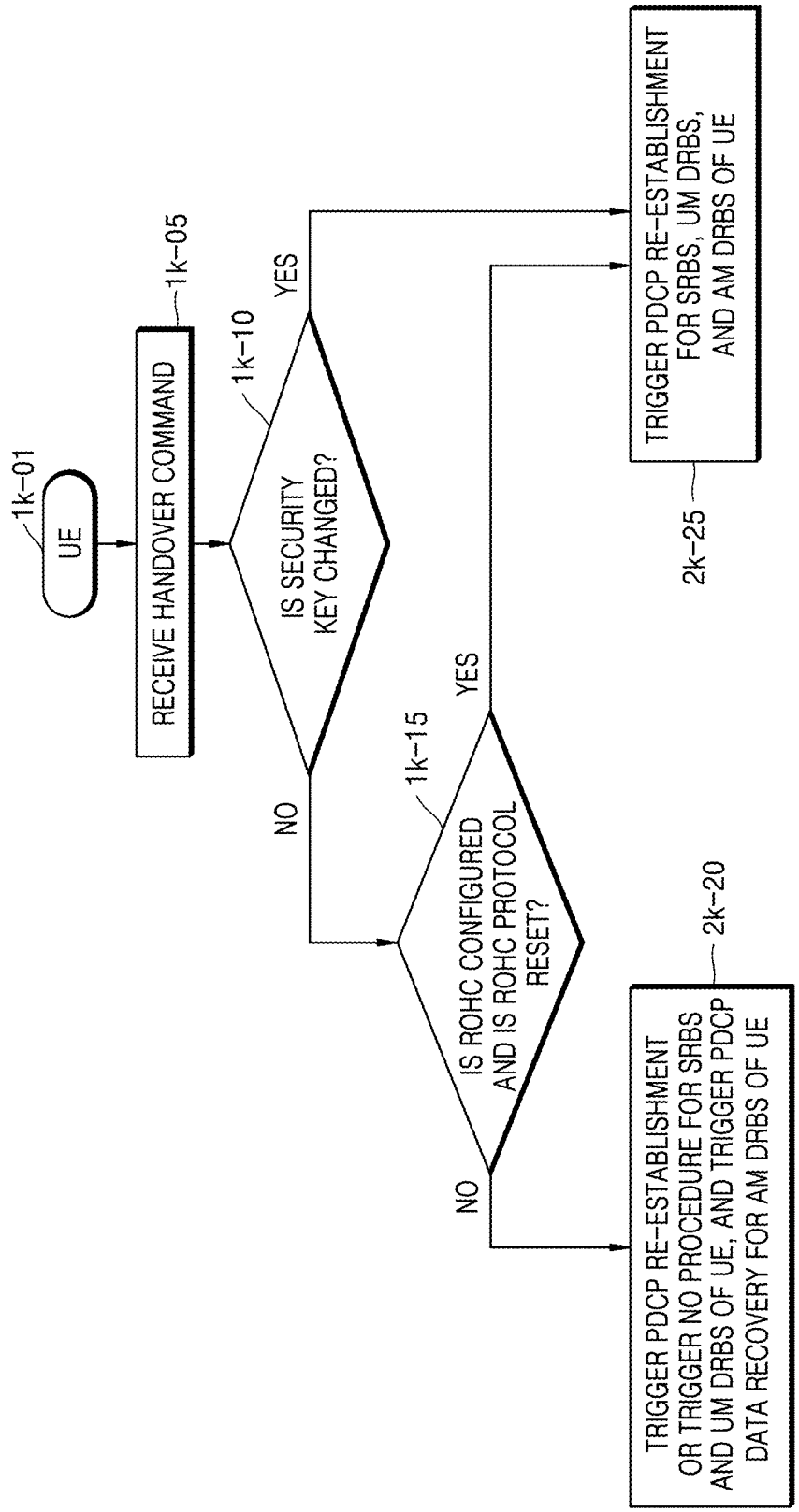
FIG. 1K illustrates a flowchart of a data processing operation per bearer of a UE in a handover procedure, according to an embodiment of the disclosure.

FIG. 1K illustrates a flowchart of a data processing operation per bearer of a UE 1k-01 in a handover procedure, according to an embodiment of the disclosure.

In FIG. 1K, when the UE 1k-01 receives an RRC message and is directed to perform handover (1k-05), and when an RRC layer determines that a security key is changed (1k-10), the UE 1k-01 may perform a PDCP procedure as directed by a base station. For example, for SRBs, UM DRBs, and AM DRBs, the UE 1k-01 may perform a PDCP procedure as directed by the base station (for example, the UE 1k-01 may perform PDCP re-establishment for all bearers) (1k-25).

When the RRC layer determines that the security key is not changed (1k-10), and when an ROHC protocol per bearer is reset (for example, when an indicator (e.g., drbROHCContinue) directing to continuously use a header compression protocol is not present) (1k-15), the UE 1k-01 may perform a PDCP procedure as directed by the base station. For example, for SRBs, UM DRBs, and AM DRBs, the UE 1k-01 may perform a PDCP procedure as directed by the base station (for example, the UE 1k-01 may perform PDCP re-establishment, perform no procedure, or perform PDCP data recovery).

When the UE 1k-01 receives the RRC message and is directed to perform handover (1k-05), when the RRC layer determines that the security key is not changed (1k-10), and when the ROHC protocol per bearer is not reset (for example, when the indicator (e.g., drbROHCContinue) directing to continuously use the header compression protocol is present) (1k-15), the UE 1k-01 may perform a different PDCP procedure based on a bearer type (1k-20). For example, for SRBs, the UE 1k-01 may perform a PDCP procedure as directed by the base station (for example, the UE 1k-01 may perform PDCP re-establishment or perform no procedure). For UM DRBs, the UE 1k-01 may perform a PDCP procedure as directed by the base station (for example, the UE 1k-01 may perform PDCP re-establishment or perform no procedure). For AM DRBs, the UE 1k-01 may perform PDCP data recovery regardless of a direction of the base station to prevent unnecessary data processing and unnecessary retransmission.

Figure 1L:
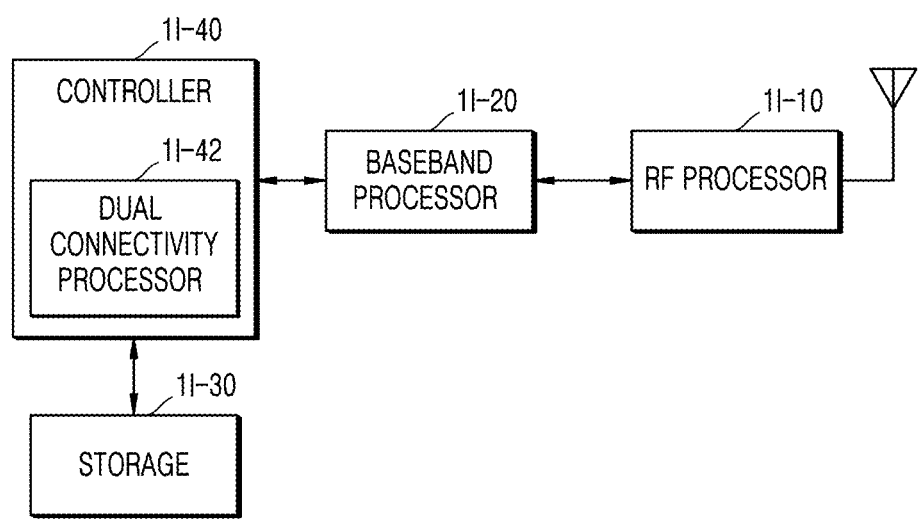
FIG. 1L illustrates a block diagram of a UE according to an embodiment of the disclosure.

FIG. 1L illustrates a block diagram of a UE according to an embodiment of the disclosure.

Referring to FIG. 1L, the UE may include a radio frequency (RF) processor 1l-10, a baseband processor 1l-20, a storage 1l-30, and a controller 1l-40. However, the above-mentioned elements are merely examples and the elements of the UE are not limited thereto.

The RF processor 1l-10 may perform functions for transmitting and receiving signals through wireless channels, e.g., band conversion and amplification of the signals. The RF processor 1l-10 may up-convert a baseband signal provided from the baseband processor 1l-20, into an RF band signal and then transmit the RF band signal through an antenna, and down-convert an RF band signal received through the antenna, into a baseband signal. For example, the RF processor 1l-10 may include a transmit filter, a receive filter, an amplifier, a mixer, an oscillator, a digital-to-analog convertor (DAC), and an analog-to-digital convertor (ADC). Although only one antenna is illustrated in FIG. 1L, the UE may include a plurality of antennas. The RF processor 1l-10 may include a plurality of RF chains. The RF processor 1l-10 may perform beamforming. For beamforming, the RF processor 1l-10 may adjust phases and intensities of signals to be transmitted or received through a plurality of antennas or antenna elements.

The RF processor 1l-10 may perform multiple-input and multiple-output (MIMO) and receive data of a plurality of layers in the MIMO operation. The RF processor 1l-10 may perform received beam sweeping by appropriately configuring a plurality of antennas or antenna elements, or adjust a direction and a beam width of a received beam to coordinate with a transmit beam, under the control of the controller 1l-40.

The baseband processor 1l-20 may convert between a baseband signal and a bitstream based on physical layer specifications of a system. For example, for data transmission, the baseband processor 1l-20 may generate complex symbols by encoding and modulating a transmit bitstream. For data reception, the baseband processor 1l-20 may reconstruct a received bitstream by demodulating and decoding a baseband signal provided from the RF processor 1l-10. For example, according to an orthogonal frequency division multiplexing (OFDM) scheme, for data transmission, the baseband processor 1l-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1l-20 may segment a baseband signal provided from the RF processor 1l-10, into OFDM symbol units, reconstruct signals mapped to subcarriers by performing fast Fourier transformation (FFT), and then reconstruct a received bitstream by demodulating and decoding the signals.

The baseband processor 1l-20 and the RF processor 1l-10 may transmit and receive signals as described above. As such, the baseband processor 1l-20 and the RF processor 1l-10 may also be called a transmitter, a receiver, a transceiver, or a communicator. At least one of the baseband processor 1l-20 or the RF processor 1l-10 may include a plurality of communication modules to support a plurality of different radio access technologies. At least one of the baseband processor 1l-20 or the RF processor 1l-10 may include different communication modules to process signals of different frequency bands. For example, the different radio access technologies may include an LTE network and an NR network. The different frequency bands may include a super-high frequency (SHF) (e.g., 2.2 GHz or 2 GHz) band and a millimeter wave (mmWave) (e.g., 60 GHz) band.

The storage 1l-30 may store basic programs, application programs, and data, e.g., configuration information, for operations of the UE. The storage 1l-30 may provide the stored data based on a request of the controller 1l-40.

The controller 1l-40 may control overall operations of the UE. For example, the controller 1l-40 may transmit and receive signals through the baseband processor 1l-20 and the RF processor 1l-10. The controller 1l-40 may record and read data on or from the storage 1l-30. In this regard, the controller 1l-40 may include at least one processor. For example, the controller 1l-40 may include a communication processor (CP) for controlling communications and an application processor (AP) for controlling an upper layer such as an application program.

Figure 1M:
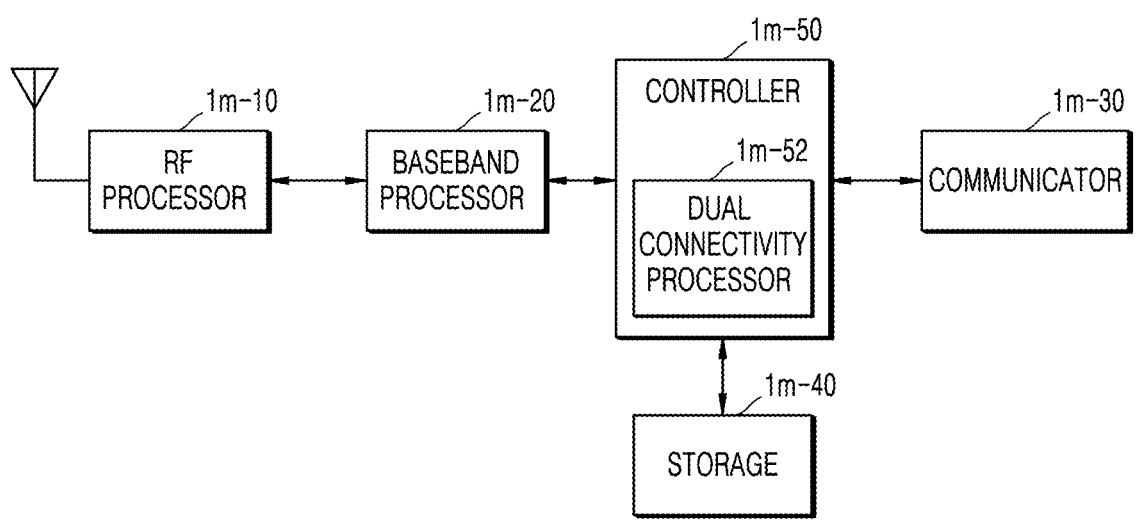
FIG. 1M illustrates a block diagram of a base station according to an embodiment of the disclosure.

FIG. 1M illustrates a block diagram of a base station according to an embodiment of the disclosure.

As illustrated in FIG. 1M, the base station may include an RF processor 1m-10, a baseband processor 1m-20, a backhaul communicator 1m-30, a storage 1m-40, and a controller 1m-50. However, the above-mentioned elements are merely examples and the elements of the base station are not limited thereto.

The RF processor 1m-10 may perform functions for transmitting and receiving signals through wireless channels, e.g., band conversion and amplification of the signals.

The RF processor 1m-10 may up-convert a baseband signal provided from the baseband processor 1m-20, into an RF band signal and then transmit the RF band signal through an antenna, and down-convert an RF band signal received through an antenna, into a baseband signal. For example, the RF processor 1m-10 may include a transmit filter, a receive filter, an amplifier, a mixer, an oscillator, a DAC, and an ADC. Although only one antenna is illustrated in FIG. 1M, the base station may include a plurality of antennas. The RF processor 1m-10 may include a plurality of RF chains. The RF processor 1m-10 may perform beamforming. For beamforming, the RF processor 1m-10 may adjust phases and intensities of signals to be transmitted or received through a plurality of antennas or antenna elements. The RF processor 1m-10 may perform DL MIMO by transmitting data of one or more layers.

The baseband processor 1m-20 may convert between a baseband signal and a bitstream based on physical layer specifications of a configured radio access technology. For example, for data transmission, the baseband processor 1m-20 may generate complex symbols by encoding and modulating a transmit bitstream. For data reception, the baseband processor 1m-20 may reconstruct a received bitstream by demodulating and decoding a baseband signal provided from the RF processor 1m-10. For example, according to an OFDM scheme, for data transmission, the baseband processor 1m-20 may generate complex symbols by encoding and modulating a transmit bitstream, map the complex symbols to subcarriers, and then configure OFDM symbols by performing IFFT and CP insertion. For data reception, the baseband processor 1m-20 may segment a baseband signal provided from the RF processor 1m-10, into OFDM symbol units, reconstruct signals mapped to subcarriers by performing FFT, and then reconstruct a received bitstream by demodulating and decoding the signals. The baseband processor 1m-20 and the RF processor 1m-10 may transmit and receive signals as described above. As such, the baseband processor 1m-20 and the RF processor 1m-10 may also be called a transmitter, a receiver, a transceiver, a communicator, or a wireless communicator.

The backhaul communicator 1m-30 may provide an interface for communicating with other nodes in a network.

The storage 1m-40 may store basic programs, application programs, and data, e.g., configuration information, for the above-described operations of the base station. In particular, the storage 1m-40 may store, for example, information about bearers assigned for a connected UE and measurement results reported from the connected UE. The storage 1m-40 may store criteria information used to determine whether to provide or release dual connectivity to or from the UE. The storage 1m-40 may provide the stored data based on a request of the controller 1m-50.

The controller 1m-50 may control overall operations of the base station. For example, the controller 1m-50 may transmit and receive signals through the baseband processor 1m-20 and the RF processor 1m-10, or the backhaul communicator 1m-30. The controller 1m-50 may record data on the storage 1m-40, and read the data recorded on the storage 1m-40. In this regard, the controller 1m-50 may include at least one processor.

It should be understood that embodiments of the disclosure described herein should be considered in a descriptive sense only and not for purposes of limitation. That is, it will be understood by one of ordinary skill in the art that various changes in form and details may be made in the embodiments of the disclosure without departing from the scope as defined by the following claims. The embodiments of the disclosure may operate in combination as necessary. For example, a base station and a UE may operate according to a combination of parts of embodiments 1, 2, 3, and 4 of the disclosure. Although the embodiments of the disclosure have been described on the basis of an NR system, modifications thereof based on the technical aspects of the embodiments of the disclosure are applicable to another system such as a frequency division duplex (FDD) or time division duplex (TDD) LTE system.

The disclosure proposes, based on implementation of a base station, a handover procedure in a mobile communication system in a case when a security key needs to be updated and a case when a security key does not need to be updated. The disclosure proposes a method of triggering a different data processing operation for each bearer to reduce data processing complexity in a case when a security key needs to be updated and a case when a security key does not need to be updated, thereby reducing data processing complexity of a UE.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:
   receiving a radio resource control (RRC) message including a handover command;
   identifying whether a security key is updated based on the RRC message; and
   performing a packet data convergence protocol (PDCP) procedure for a bearer based on a bearer type and whether the security key is updated,
   wherein the PDCP procedure includes a PDCP data recovery procedure or a PDCP re-establishment procedure,
   wherein the bearer type is one of a signaling radio bearer (SRB), an acknowledged mode data radio bearer (AM DRB), or an unacknowledged mode (UM) DRB,
   wherein, in case that the security key is not updated and the bearer type is the AM DRB, the PDCP data recovery procedure is triggered,
   wherein, in case that the security key is not updated and the bearer type is one of the SRB or the UM DRB, the PDCP procedure is not triggered, and
   wherein, in case that the security key is not updated, an indication associated with robust header compression (ROHC) is not configured for initializing the ROHC.

2. The method of claim 1, wherein, in case that the security key is updated, the performing of the PDCP procedure comprises performing the PDCP re-establishment procedure for the SRB, the UM DRB, and the AM DRB based on the updated security key.

3. The method of claim 1, wherein the security key is not updated based on a handover within a distributed unit (DU) or between DUs connected to a same central unit (CU).

4. A method performed by a base station, the method comprising:
   identifying whether to update a security key;
   transmitting a radio resource control (RRC) message including a handover command to a user equipment (UE), wherein whether the security key is updated is identified based on the RRC message; and
   performing a packet data convergence protocol (PDCP) procedure for a bearer based on a bearer type and whether the security key is updated, wherein the PDCP procedure includes a PDCP data recovery procedure or a PDCP re-establishment procedure, wherein the bearer type is one of a signaling radio bearer (SRB), an acknowledged mode data radio bearer (AM DRB) or an unacknowledged mode (UM) DRB, wherein, in case that the security key is not updated and the bearer type is the AM DRB, the PDCP data recovery procedure is triggered, wherein, in case that the security key is not updated and the bearer type is one of the SRB or the UM DRB, the PDCP procedure is not triggered, and wherein, in case that the security key is not updated, an indication associated with robust header compression (ROHC) is not configured for initializing the ROHC.

5. The method of claim 4, wherein, in case that the security key is updated, the performing of the PDCP procedure comprises performing the PDCP re-establishment procedure for the SRB, the UM DRB, and the AM DRB based on the updated security key.

6. The method of claim 4, wherein the security key is not updated based on a handover within a distributed unit (DU) or between DUs connected to a same central unit (CU).

7. A user equipment (UE) comprising:
a transceiver; and
a processor configured to:
receive, via the transceiver, a radio resource control (RRC) message including a handover command,
identify whether a security key is updated based on the RRC message, and
perform a packet data convergence protocol (PDCP) procedure for a bearer based on a bearer type and whether the security key is updated, wherein the PDCP procedure includes a PDCP data recovery procedure or a PDCP re-establishment procedure, wherein the bearer type is one of a signaling radio bearer (SRB), an acknowledged mode data radio bearer (AM DRB) or an unacknowledged mode (UM) DRB, wherein, in case that the security key is not updated and the bearer type is the AM DRB, the PDCP data recovery procedure is triggered, wherein, in case that the security key is not updated and the bearer type is one of the SRB or the UM DRB, the PDCP procedure is not triggered, and wherein, in case that the security key is not updated, an indication associated with robust header compression (ROHC) is not configured for initializing the ROHC.

8. The UE of claim 7, wherein, in case that the security key is updated, the processor is configured to perform the PDCP re-establishment procedure for the SRB, the UM DRB, and the AM DRB based on the updated security key.

9. The UE of claim 7, wherein the security key is not updated based on a handover within a distributed unit (DU) or between DUs connected to a same central unit (CU).

* * * * *